(12) United States Patent
Glick et al.

(10) Patent No.: US 8,336,100 B1
(45) Date of Patent: Dec. 18, 2012

(54) SYSTEMS AND METHODS FOR USING REPUTATION DATA TO DETECT PACKED MALWARE

(75) Inventors: Adam Glick, Culver City, CA (US); Nicholas Graf, Culver City, CA (US); Spencer Smith, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 557 days.

(21) Appl. No.: 12/545,527

(22) Filed: Aug. 21, 2009

(51) Int. Cl.
*G06F 21/00* (2006.01)

(52) U.S. Cl. ............. 726/23; 726/22; 726/24; 713/150; 713/152; 713/153; 713/154; 713/155; 713/156; 713/157; 713/158; 713/159; 713/160; 713/161; 713/162; 713/163; 713/164; 713/165; 713/166; 713/167; 713/168; 713/169; 713/170; 713/171; 713/172; 713/173; 713/174; 713/175; 713/176; 713/177; 713/178; 713/179; 713/180; 713/181

(58) Field of Classification Search ............... 726/23, 726/22, 24; 713/150–181
See application file for complete search history.

(56) References Cited

U.S. PATENT DOCUMENTS

| | | | |
|---|---|---|---|
| 6,766,458 B1 * | 7/2004 | Harris et al. ............... 726/6 |
| 7,263,561 B1 * | 8/2007 | Green et al. ............... 709/246 |
| 7,269,851 B2 | 9/2007 | Ackroyd | |
| 7,831,412 B1 | 11/2010 | Sobel et al. | |
| 7,979,709 B2 * | 7/2011 | Takashima et al. ........... 713/176 |
| 7,996,904 B1 * | 8/2011 | Chiueh et al. ............ 726/24 |
| 2005/0193173 A1 * | 9/2005 | Ring et al. ............. 711/118 |
| 2005/0229250 A1 * | 10/2005 | Ring et al. ............. 726/23 |
| 2005/0283831 A1 | 12/2005 | Ryu et al. | |
| 2006/0253584 A1 | 11/2006 | Dixon et al. | |
| 2007/0016953 A1 * | 1/2007 | Morris et al. ............. 726/24 |
| 2008/0016568 A1 * | 1/2008 | Szor et al. ............. 726/22 |
| 2008/0040710 A1 * | 2/2008 | Chiriac ................. 717/136 |
| 2008/0244748 A1 * | 10/2008 | Neystadt et al. ............. 726/25 |
| 2009/0126012 A1 * | 5/2009 | Treadwell et al. ............. 726/22 |

OTHER PUBLICATIONS

Espacenet search, Espacenet Result List, Jan. 2012.*
Sourabh Satish et al, Social Trust Based Security Model, Mar. 31, 2006, U.S. Appl. No. 11/394,846.*
Satish, Sourabh; U.S. Appl. No. 12/049,751, filed Mar. 17, 2008.
Satish, Sourabh; U.S. Appl. No. 12/056,379, filed Mar. 27, 2008.
Nachenberg, Carey S.; U.S. Appl. No. 12/415,834, filed Mar. 31, 2009.
Sourabh Satish et al.; Social Trust Based Security Model; Mar. 31, 2006; U.S. Appl. No. 11/394,846.

* cited by examiner

*Primary Examiner* — Kaveh Abrishamkar
*Assistant Examiner* — Shan Elahi
(74) *Attorney, Agent, or Firm* — Advantedge Law Group (57) ABSTRACT

A computer-implemented method for using reputation data to detect packed malware may include: 1) identifying a file downloaded from a portal, 2) determining that the file has been packed, 3) obtaining community-based reputation data for the file, 4) determining, by analyzing the reputation data, that instances of the file have been encountered infrequently (or have never been encountered) within the community, and then 5) performing a security operation on the file (by, for example, quarantining or deleting the file).

20 Claims, 6 Drawing Sheets

SYSTEMS AND METHODS FOR USING REPUTATION DATA TO DETECT PACKED MALWARE

BACKGROUND

In recent years, authors of malicious software ("malware") have attempted to proliferate malware by generating thousands or potentially millions of variations of a malicious file. For example, a malware author may create a unique version of a malicious file for each intended target by repacking (i.e., compressing, encrypting, and/or otherwise obfuscating) the file on a server before distributing the same. Unfortunately, because many existing anti-virus technologies detect malware by detecting or identifying unique digital signatures or fingerprints associated with known-malicious files, malware authors may avoid detection by only distributing new (i.e., unique), repacked versions of malicious files.

In light of this, at least one security-software vendor has begun implementing reputation-based security systems. In a reputation-based security system, a security-software vendor may attempt to determine the trustworthiness of a file by collecting, aggregating, and analyzing data from potentially millions of user devices within a community, such as the security-software vendor's user base. For example, by determining a file's origin, age, and prevalence within the community (such as whether the file is predominantly found on at-risk or "unhealthy" machines within the community), among other details, a security-software vendor may gain a fairly accurate understanding as to the trustworthiness of the file.

However, in order to avoid producing an unacceptable number of false positives, reputation-based security systems may allow new files (i.e., files that have not been encountered before within the community) to be stored and run on user devices. Thus, by only distributing unique, repacked versions of malicious files, malware authors may circumvent some reputation-based security systems. As such, the instant disclosure identifies a need for systems and methods for effectively detecting unique instances of packed malware.

SUMMARY

As will be described in greater detail below, the instant disclosure generally relates to systems and methods for using reputation data to detect packed malware. In one example, the various systems and methods described herein may accomplish this by: 1) identifying a file (such as an executable file) downloaded from a portal (such as a Web browser), 2) determining that the file has been packed, 3) obtaining community-based reputation data for the file, 4) determining, by analyzing the reputation data, that instances of the file have been encountered infrequently (or have never been encountered) within the community, and then 5) performing a security operation on the file (by, for example, quarantining or deleting the file).

Since, as explained in greater detail below, legitimate software is not typically repacked for each customer (i.e., legitimate software is not typically packed as singletons), the various systems and methods described herein may effectively detect packed malware by determining whether instances of a packed file have been encountered infrequently (or have never been encountered) within an enterprise or user base. As such, these systems and methods may effectively address an existing flaw in conventional security software without unduly increasing false-positive rates.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using reputation data to detect packed malware. In one example, the various systems and methods described herein may accomplish this by: 1) identifying a file (such as an executable file) downloaded from a portal (such as a Web browser), 2) determining that the file has been packed, 3) obtaining community-based reputation data for the file, 4) determining, by analyzing the reputation data, that instances of the file have been encountered infrequently (or have never been encountered) within the community, and then 5) performing a security operation on the file (by, for example, quarantining or deleting the file).

The term "packer," as used herein, generally refers to any type or form of tool used to obfuscate compiled binary files. As such, a "packed file" may refer to a complied binary file whose nature has been obfuscated in some way (either intentionally or unintentionally) by a packer. Examples of packers that may be used to obfuscate files include, without limitation, compressors (such as UPX, ASPACK, and UPACK) that compress files, crypters (such as POLYCRYPT PE) that encrypt files, protectors (such as ARMADILLO and THEMIDA) that both compress and encrypt files, bundlers (such as PEBUNDLE and MOLEBOX) that bundle multiple executable and data files into a single bundled executable file, and the like.

Figure 1:
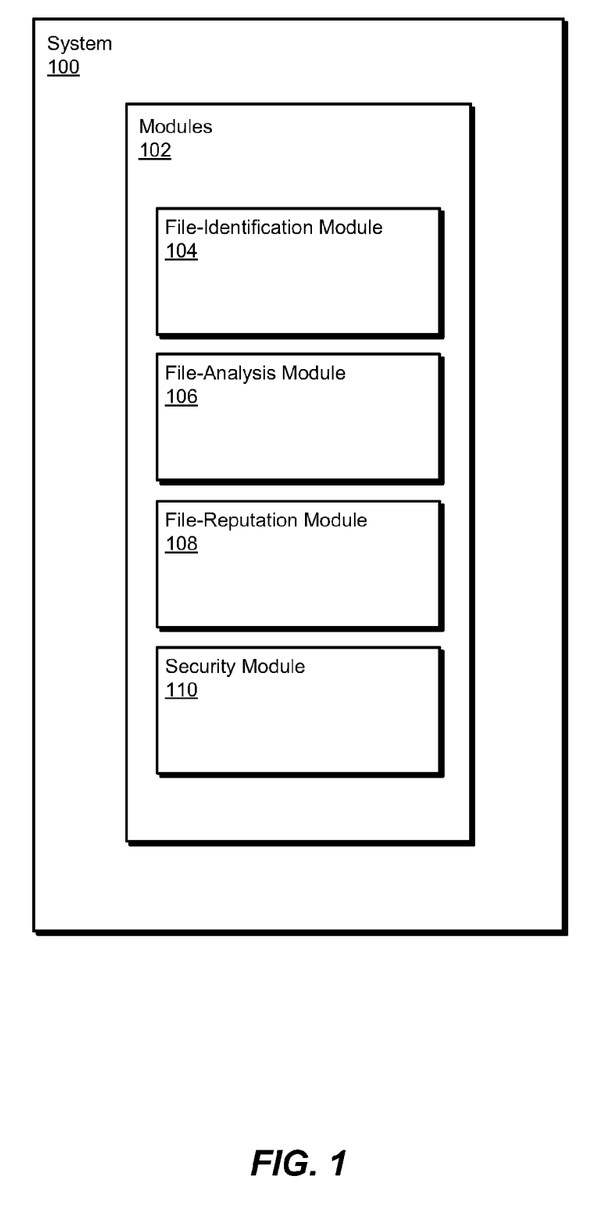
FIG. 1 is a block diagram of an exemplary system for using reputation data to detect packed malware.
Figure 2:
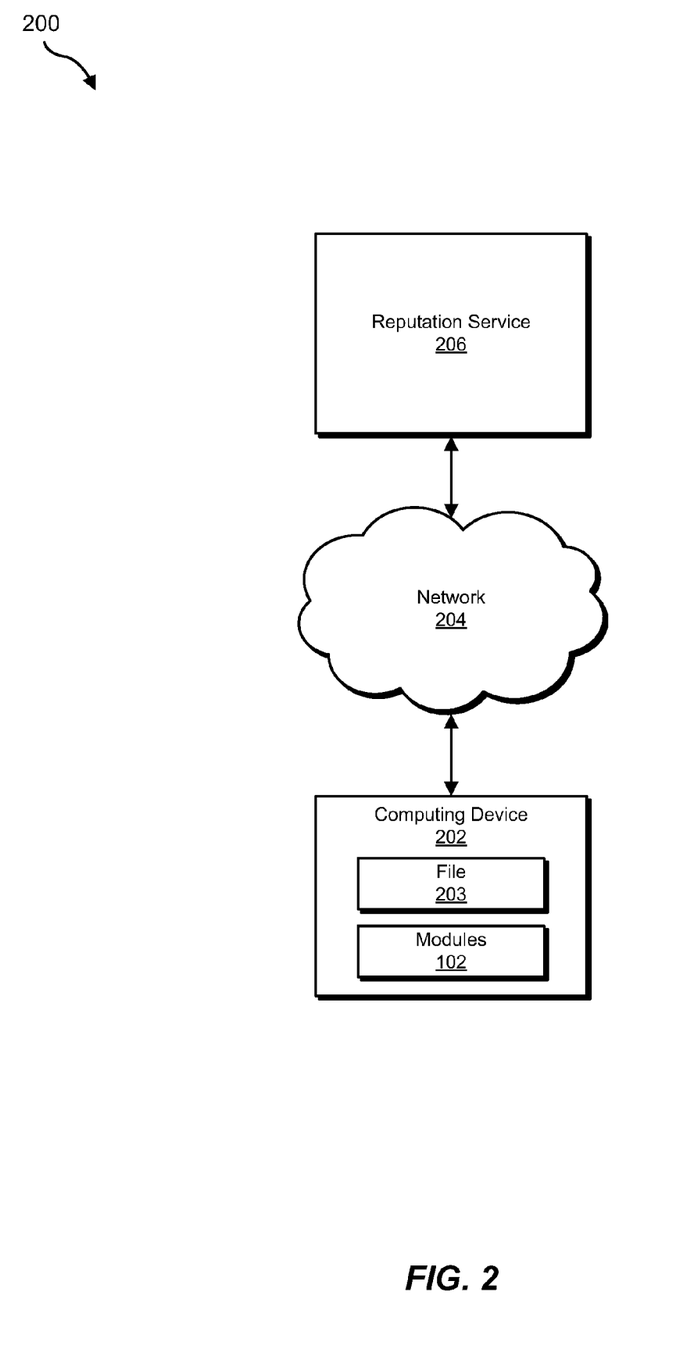
FIG. 2 is a block diagram of an exemplary system for using reputation data to detect packed malware.

The following will provide, with reference to FIGS. 1-2, detailed descriptions of exemplary systems for using reputation data to detect packed malware. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for using reputation data to detect packed malware. As illustrated in this figure, exemplary system 100 may include one or more modules 102 for performing one or more tasks. For example, and as will be explained in greater detail below, exemplary system 100 may include a file-identification module 104 programmed to identify files obtained or downloaded from portals (such as Web browsers). Exemplary system 100 may also include file-analysis module 106 programmed to determine whether files have been packed.

In addition, and as will be described in greater detail below, exemplary system 100 may include a file-reputation module 108 programmed to obtain community-based reputation data for files. Exemplary system 100 may also include a security module 110 programmed to: 1) determine, by analyzing reputation data for a file, whether instances of the file have been encountered infrequently (or have never been encountered) and, if so, then 2) perform a security operation on the file (by, for example, quarantining or deleting the file). Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

As shown in FIG. 2, system 200 may include a computing device 202 in communication with a reputation service 206 via a network 204. In one embodiment, and as will be described in greater detail below, computing device 202 may be programmed to: 1) identify a file (such as a file 203) downloaded from a portal (such as a Web browser), 2) determine that file 203 has been packed, 3) obtain community-based reputation data for file 203 from reputation service 206, 4) determine, by analyzing the reputation data, that instances of file 203 have been encountered infrequently (or have never been encountered) within a community associated with reputation service 206, and then 5) perform a security operation on file 203 (by, for example, quarantining or deleting file 203).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Reputation service 206 generally represents any type or form of computing subsystem used to generate and provide information that identifies a file's reputation or prevalence. As will be explained in greater detail below, in some examples reputation service 206 may generate such information by collecting, aggregating, and analyzing data from user devices within a community (such as, e.g., an enterprise or the user base of a security-software publisher).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and reputation service 206.

Figure 3:
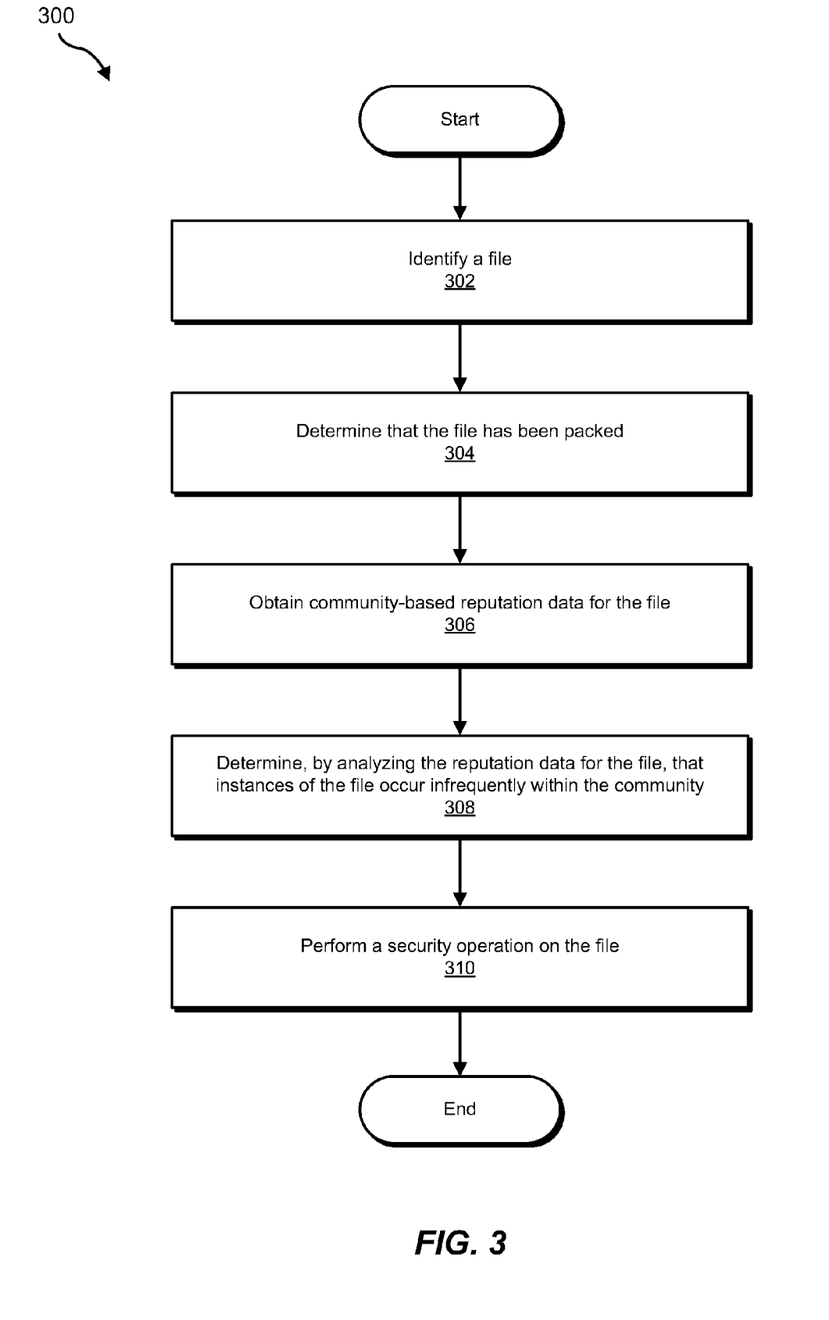
FIG. 3 is a flow diagram of an exemplary method for using reputation data to detect packed malware.

FIG. 3 is a flow diagram of an exemplary computer-implemented method 300 for using reputation data to detect packed malware. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the various systems described herein may identify a file. For example, file-identification module 104 in FIG. 1 (which may, as detailed above, represent a portion of computing device 202 in FIG. 2) may identify file 203 on computing device 202.

File-identification module 104 may identify files in a variety of ways. In one example, file-identification module 104 may identify a file as it is downloaded from a portal (such as a Web browser). In other examples, file-identification module 104 may identify a file when it is loaded into memory (i.e., at load time) or when the file begins executing instructions (i.e., at runtime).

At step 304, the systems described herein may determine that the file identified in step 302 has been packed (i.e., that the file identified in step 302 represents a packed file). For example, file-analysis module 106 in FIG. 1 (which may, as detailed above, represent a portion of computing device 202 in FIG. 2) may determine that file 203 on computing device 202 has been packed.

File-analysis module 106 may determine that a file has been packed in a variety of ways. For example, file-analysis module 106 may apply one or more heuristics or rules (such as construction-pointer-based rules, stack-pointer-based rules, signature-based rules, and/or behavior-based rules) to file 203 in order to determine whether file 203 has been packed.

In some examples, file-analysis module 106 may also determine whether the file identified in step 302 has been packed using a non-standard file packer. For example, file-analysis module 106 may determine whether file 203 has been packed using an unrecognized or custom file packer. In some examples, the use of an unrecognized or non-standard file packer may be an indicator for malware.

At step 306, the systems described herein may obtain community-based reputation data for the file identified in step 302. For example, file-reputation module 108 in FIG. 1 (which may, as detailed above, represent a portion of computing device 202 in FIG. 2) may obtain community-based reputation data for file 203.

The term "reputation data," as used herein, generally refers to information that identifies a file's reputation or prevalence within a community (e.g., the user base of a security-software publisher). Examples of reputation data include, without limitation, reputation scores (where, for example, high reputation scores indicate that a file is generally trusted within a community and low reputation scores indicate that a file is generally untrusted within a community), prevalence information (e.g., information that identifies the number or percentage of user devices within a community that contain an instance of the file), or any other information that may be used to identify a community's opinion on the trustworthiness or legitimacy of a file, such as the file's location or origin, age, etc.

In one example, the system may obtain reputation data in step 306 from a reputation service, such as reputation service 206 in FIG. 2. As detailed above, reputation services may generate reputation data for files by collecting, aggregating, and analyzing data from user devices within a community. Examples of data gathered from user devices within a community that may be used to generate reputation data include, without limitation, information that identifies the overall health of a user device (i.e., information that identifies the performance, stability, and/or state of security of the user device), information that identifies the files stored on a user device, information that identifies the impact of a file on the health of the user device (e.g., information that identifies the health of a user device both before and after the file is stored on the user device), and any other information that may be used to evaluate the trustworthiness of a file. In some examples, by collecting, aggregating, and analyzing this data from potentially millions of user devices within a community (such as the user base of a security-software publisher), reputation services may be able to gain a fairly accurate understanding as to the trustworthiness of a file.

The various systems described herein may perform step 306 in a variety of ways. In one example, file-reputation module 108 in FIG. 1 may obtain reputation data for file 203 from reputation service 206 in FIG. 2 by: 1) generating a hash for file 203, 2) sending this hash to reputation service 206, and then 3) receiving the requested reputation data for file 203 from reputation service 206.

Figure 4:
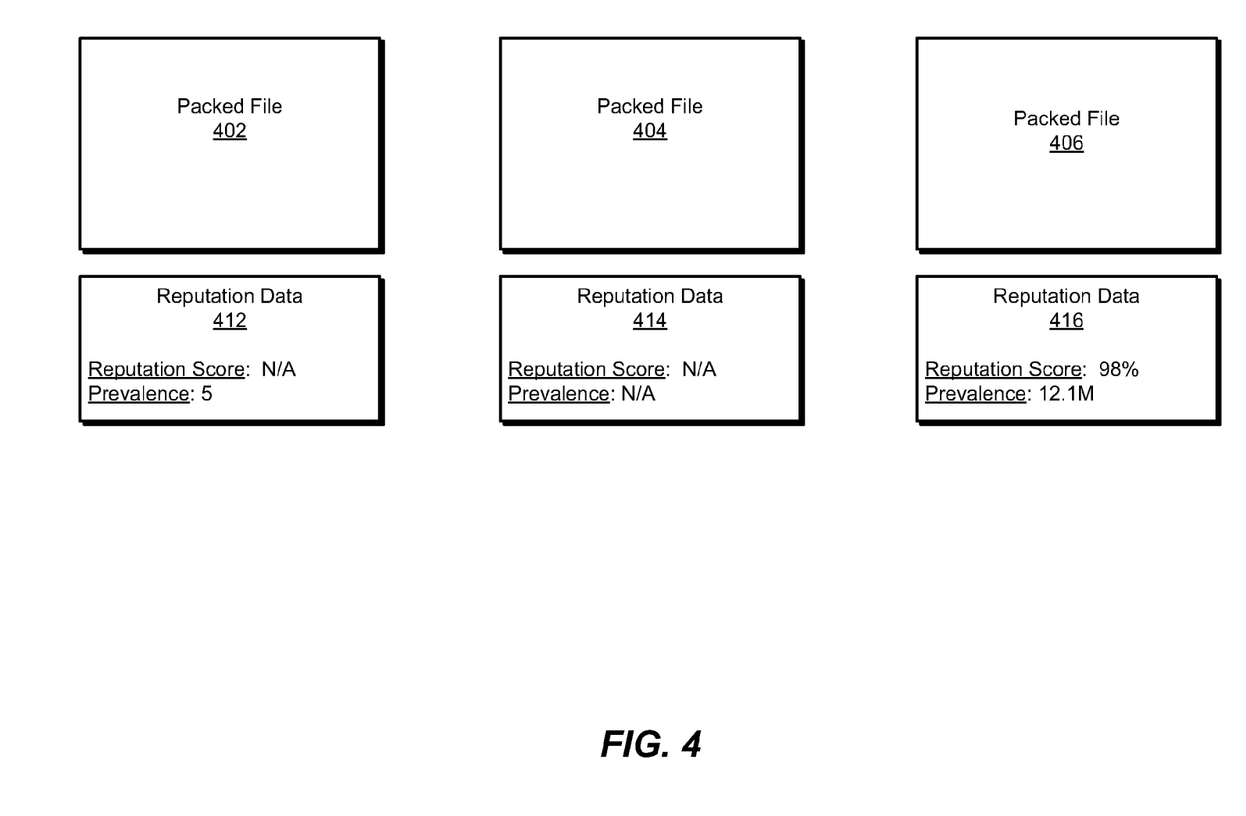
FIG. 4 is an exemplary illustration of reputation data received from a reputation service for executable file.

FIG. 4 provides an exemplary illustration of reputation data that may be obtained from a reputation service. As illustrated in this figure, reputation data 412, 414, and 416 may contain information that identifies both a reputation score and prevalence information for packed files 402 (N/A and 5 users, respectively), 404 (N/A and N/A, respectively), and 406 (98% and 12.1 million users, respectively), respectively.

At step 308, the systems described herein may determine, by analyzing the reputation data obtained in step 306, that instances of the file identified in step 302 occur infrequently (or have never occurred) within the community. For example, security module 110 in FIG. 1 may determine, by analyzing reputation data 412 in FIG. 4, that an extremely limited number of user devices (in this example, five) within an enterprise or user base (which may, as detailed above, consist of hundreds of thousands or potentially millions of users) have encountered instances of packed file 402. Similarly, since reputation data 414 in FIG. 4 indicates that prevalence information for packed file 404 is unavailable, security module 110 may determine that an instance of packed file 404 has not occurred before within the community (i.e., security module 110 may determine that packed file 404 represents new file or singleton).

Because legitimate software is not typically repacked for each customer (i.e., legitimate software is not typically packed as singletons), security module 110 may determine that packed files 402 and 404 represent security risks since: 1) these files have been packed and 2) instances of these files have not occurred before, or have only occurred infrequently, within the community. In contrast, security module 110 may determine that packed file 406 does not represent a security risk since over 12 million instances of this packed file are present within the community.

In some examples, security module 110 may only convict a packed file (i.e., determine that a packed file represents a security risk) if an instance of the packed file has never been encountered before within the community (i.e., the packed file represents a new file or singleton). In other examples, security module 110 may convict a packed file if less than a predetermined number of instances of the packed file appear within the community or instances of the packed file appear on less than a predetermined percentage of user devices within the community. These predetermined percentages and numbers may be determined based on a variety of predictive rules and heuristics.

Returning to FIG. 3, at step 310 the systems described herein may perform a security operation on the packed file. For example, security module 110 in FIG. 1 may perform a security operation on packed file 402 in FIG. 4.

Examples of security operations that security module 110 may perform include, without limitation, quarantining the file, removing the file, preventing the file from executing, flagging the file for further evaluation, or any other operation that may be used to analyze or reduce the potential security risk posed by the file. Upon completion of step 310, exemplary method 300 in FIG. 3 may terminate.

Although not illustrated in FIG. 3, in some examples exemplary method 300 may also include sending information that identifies the file as a security risk to a reputation service. For example, file-reputation module 108 in FIG. 1 may, upon determining that packed file 402 represents a security risk, transmit the results of this determination to reputation service 206 in FIG. 2. Reputation service 206 may then use this information to update the reputation data associated with packed file 402.

Since, as detailed above, legitimate software is not typically repacked for each customer (i.e., legitimate software is not typically packed as singletons), the various systems and methods described herein may effectively detect packed malware by determining whether instances of a packed file have been encountered infrequently (or have never been encountered) within an enterprise or user base. As such, these systems and methods may effectively address an existing flaw in conventional security software without unduly increasing false-positive rates.

Figure 5:
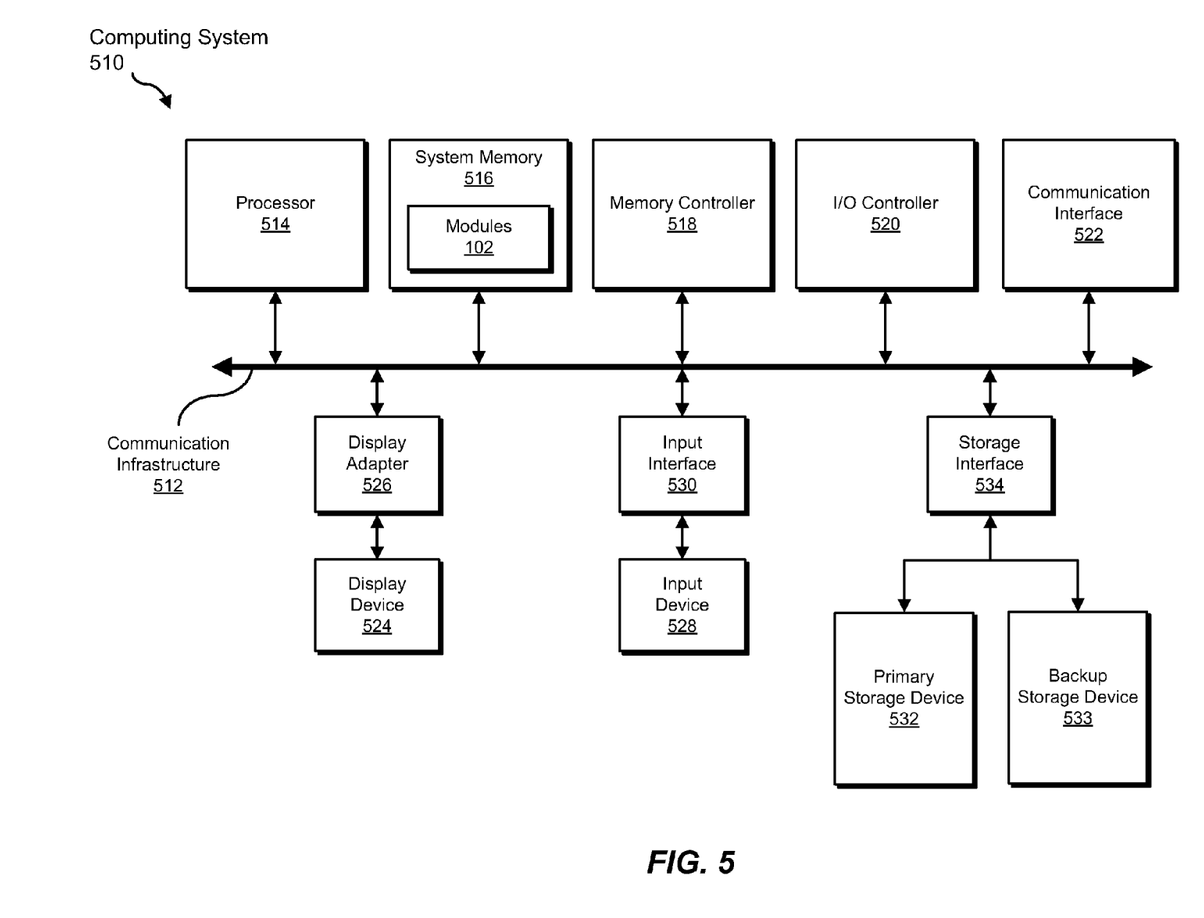
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, determining, obtaining, analyzing, performing, detecting, sending, receiving, quarantining, removing, preventing, and flagging steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, determining, obtaining, analyzing, performing, detecting, sending, receiving, quarantining, removing, preventing, and flagging.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, determining, obtaining, analyzing, performing, detecting, sending, receiving, quarantining, removing, preventing, and flagging steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, determining, obtaining, analyzing, performing, detecting, sending, receiving, quarantining, removing, preventing, and flagging steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510.

Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, determining, obtaining, analyzing, performing, detecting, sending, receiving, quarantining, removing, preventing, and flagging steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, determining, obtaining, analyzing, performing, detecting, sending, receiving, quarantining, removing, preventing, and flagging steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
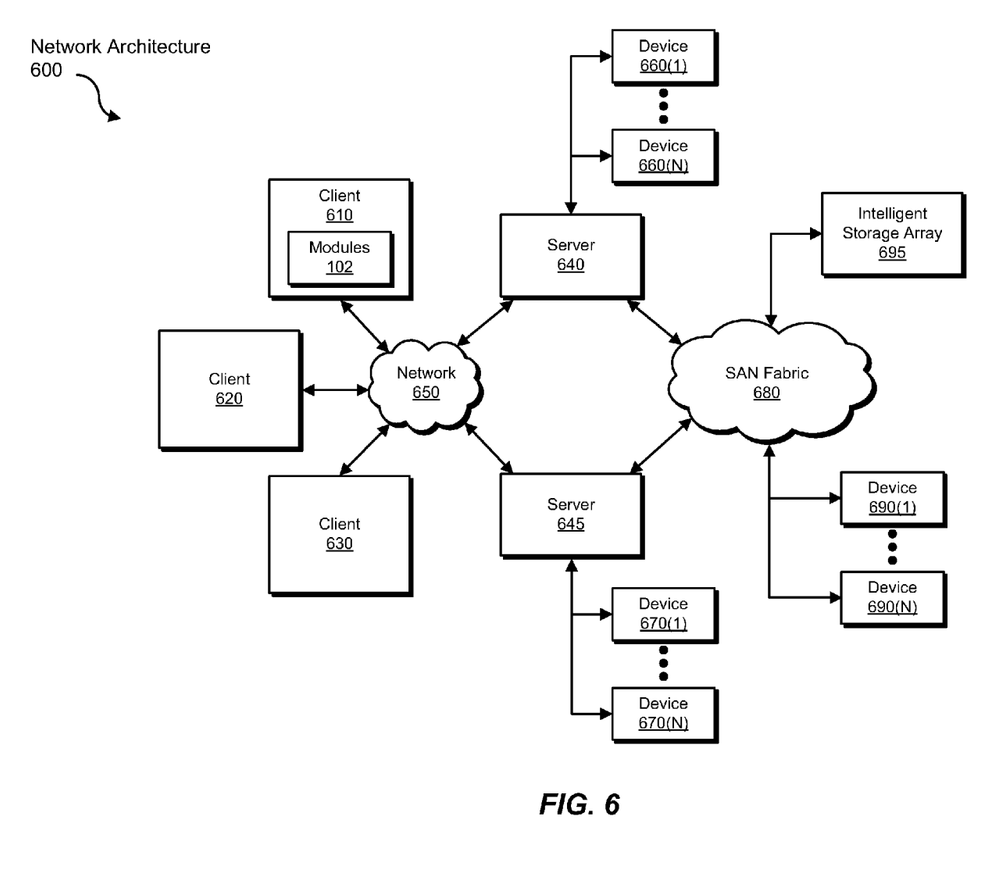
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a Web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, determining, obtaining, analyzing, performing, detecting, sending, receiving, quarantining, removing, preventing, and flagging steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for using reputation data to detect packed malware. In one example, this exemplary method may include: 1) identifying a file and then 2) determining that the file represents a security risk by a) determining that the file has been packed, b) obtaining community-based reputation data for the file, and c) determining, by analyzing the reputation data, that instances of the file occur infrequently within the community.

In this example, the method may also include performing a security operation on the file. Performing the security operation may include quarantining the file, removing the file, preventing the file from executing, and/or flagging the file for further evaluation.

In one example, identifying the file may include detecting the file as it downloaded from a portal. In addition, determining that the file has been packed may also include determining that the file has been packed using a non-standard file packer.

The reputation data may include information that identifies the file's reputation and/or prevalence within a community. In this example, determining that instances of the file occur infrequently within the community may include determining that the file's prevalence information indicates that an instance of the file has not occurred before within the community.

In some examples, obtaining reputation data for the file may include: 1) sending a request for reputation data for the file to a reputation service, the request comprising a hash of the file and then 2) receiving the reputation data for the file from the reputation service. In this example, the method may also include, upon determining that the file represents a security risk, sending information that identifies the file as a security risk to the reputation service.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, security module 110 in FIG. 1 may transform a characteristic or property of computing device 202 in FIG. 2 by quarantining or removing a malicious on computing device 202.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using reputation data to detect packed malware, at least a portion of the method being performed by a computing device comprising at least one processor, the method comprising:

identifying a file;

determining that the file has been packed;

obtaining community-based reputation data for the file that identifies the file's prevalence within a community of users, wherein the reputation data for the file is based at least in part on information obtained from computing devices within the community of users;

determining, by analyzing the reputation data for the file, that the file's prevalence within the community of users fails to satisfy a predetermined prevalence threshold;

convicting the file as a security risk in response to determining both that the file has been packed and that the file's prevalence within the community of users fails to satisfy the predetermined prevalence threshold;
performing a security operation on the file in response to convicting the file as a security risk.

2. The method of claim 1, wherein identifying the file comprises detecting the file as it downloaded from a portal.

3. The method of claim 1, wherein determining that the file has been packed further comprises determining that the file has been packed using a non-standard file packer.

4. The method of claim 1, wherein the reputation data for the file further comprises information that identifies the file's reputation within the community of users.

5. The method of claim 1, wherein determining that the file's prevalence within the community of users fails to satisfy the predetermined prevalence threshold comprises determining that the reputation data for the file indicates that an instance of the file has not occurred before within the community of users.

6. The method of claim 1, wherein obtaining the reputation data for the file comprises:
sending a request for the reputation data for the file to a reputation service, the request comprising a hash of the file;
receiving the reputation data for the file from the reputation service.

7. The method of claim 6, further comprising, upon convicting the file as a security risk, sending information that identifies the file as a security risk to the reputation service.

8. The method of claim 1, wherein performing the security operation comprises at least one of:
quarantining the file;
removing the file;
preventing the file from executing;
flagging the file for further evaluation.

9. A system for using reputation data to detect packed malware, the system comprising:
a file-identification module programmed to identify a file;
a file-analysis module programmed to determine that the file has been packed;
a file-reputation module programmed to obtain community-based reputation data for the file that identifies the file's prevalence within a community of users, wherein the reputation data for the file is based at least in part on information obtained from computing devices within the community of users;
a security module programmed to:
determine, by analyzing the reputation data for the file, that the file's prevalence within the community of users fails to satisfy a predetermined prevalence threshold;
convict the file as a security risk in response to determining both that the file has been packed and that the file's prevalence within the community of users fails to satisfy the predetermined prevalence threshold;
perform a security operation on the file in response to convicting the file as a security risk;
at least one processor configured to execute the file-identification module, the file-analysis module, the file-reputation module, and the security module.

10. The system of claim 9, wherein the file-identification module identifies the file by detecting the file as it downloaded from a portal.

11. The system of claim 9, wherein the file-analysis module is further programmed to determine that the file has been packed using a non-standard file packer.

12. The system of claim 9, wherein the reputation data for the file further comprises information that identifies the file's reputation within the community of users.

13. The system of claim 9, wherein the security module determines that the file's prevalence within the community of users fails to satisfy the predetermined prevalence threshold by determining that the reputation data for the file indicates that an instance of the file has not occurred before within the community of users.

14. The system of claim 9, wherein the file-reputation module obtains the reputation data for the file by:
sending a request for the reputation data for the file to a reputation service, the request comprising a hash of the file;
receiving the reputation data for the file from the reputation service.

15. The system of claim 14, wherein, upon convicting the file represents as a security risk, the security module is further programmed to send information that identifies the file as a security risk to the reputation service.

16. The system of claim 9, wherein the security module performs the security operation by at least one of:
quarantining the file;
removing the file;
preventing the file from executing;
flagging the file for further evaluation.

17. A non-transitory computer-readable medium comprising computer-executable instructions that, when executed by at least one processor of a computing device, cause the computing device to:
identify a file;
determine that the file has been packed;
obtain community-based reputation data for the file that identifies the file's prevalence within a community of users, wherein the reputation data for the file is based at least in part on information obtained from computing devices within the community of users;
determine, by analyzing the reputation data for the file, that the file's prevalence within the community of users fails to satisfy a predetermined prevalence threshold;
convict the file as a security risk in response to determining both that the file has been packed and that the file's prevalence within the community of users fails to satisfy the predetermined prevalence threshold;
perform a security operation on the file in response to convicting the file as a security risk.

18. The computer-readable medium of claim 17, wherein the computer-executable instructions, when executed by the processor of the computing device, cause the computing device to identify the file by detecting the file as it downloaded from a portal.

19. The computer-readable medium of claim 17, wherein the reputation data further comprises information that identifies the file's reputation within the community of users.

20. The computer-readable medium of claim 17, wherein the computer-executable instructions, when executed by the processor of the computing device, cause the computing device to determine that the file's prevalence within the community of users fails to satisfy the predetermined prevalence threshold by determining that the reputation data for the file indicates that an instance of the file has not occurred before within the community of users.

* * * * *

UNITED STATES PATENT AND TRADEMARK OFFICE
CERTIFICATE OF CORRECTION

PATENT NO.         : 8,336,100 B1
APPLICATION NO.    : 12/545527
DATED              : December 18, 2012
INVENTOR(S)        : Adam Glick et al.

Page 1 of 1

It is certified that error appears in the above-identified patent and that said Letters Patent is hereby corrected as shown below:

Claim 15, at column 14, lines 17 to 20, should read:

The system of claim 14, wherein, upon convicting the file as a security risk, the security module is further programmed to send information that identifies the file as a security risk to the reputation service.

Signed and Sealed this
Twenty-sixth Day of March, 2013

Teresa Stanek Rea
*Acting Director of the United States Patent and Trademark Office*